April 16, 1957 — T. M. DEAKIN — 2,788,618
BEVEL GEAR GENERATING MACHINE
Filed Feb. 25, 1954 — 7 Sheets-Sheet 1

Inventor
Thomas Meyrick Deakin
Karl W. Flocks
Attorney

United States Patent Office 2,788,618
Patented Apr. 16, 1957

2,788,618

BEVEL GEAR GENERATING MACHINE

Thomas Meyrick Deakin, London, England, assignor to Deakin Gears Limited, London, England, a British company Application February 25, 1954, Serial No. 412,565

Claims priority, application Great Britain February 26, 1953

8 Claims. (Cl. 51—56)

This invention relates to bevel gear generating machines for forming or measuring the profiles of bevel gear teeth and is a continuation-in-part of my earlier pending patent application Serial No. 295,658, filed June 26, 1952.

Figures 7, 9, and 18 of the drawings of the earlier application show an arrangement for mounting a pair of alternatively operative grinding wheels 2, 2' which, as shown, are set at an angle to each other of twice the pressure angle of the gear tooth 9 to be machined. This setting of the wheels is appropriate to the machining of an octoid tooth profile. When, however, a spherical involute tooth profile is to be machined, the wheels 2, 2' must be set normal to the generating plane 3. With the construction of the tool carriage illustrated in Figure 18 of the drawings of the said earlier application, however, only one tool at a time can be set normal to the generating plane 3. This is because the tools are shown therein as carried on respective pressure angle adjusting brackets 175, 176 which are pivoted on the tool carriage 37 about a common pivot pin 173. This pin is locked in the boss 172 and hole 174 in the table 168a and flange 168b, respectively, which together constitute the tool carriage 37.

It is an object of the present improvement to provide a construction whereby both tools 2, 2' can be simultaneously set to a position in which each is normal to the generating plane 3. This is achieved by mounting the tools on respective carriers, such as brackets similar to those shown at 175, 176 in the above mentioned drawings, each carrier being pivoted about a separate axis parallel to the generating plane and to the pivot axis of the other carrier, the two axes extending in the general direction of the traverse of the tool along the tooth flank. The distance between the two pivot axes is not critical, but for any given machine it will normally be chosen so as to give a reasonable clearance between the adjacent faces of the grinding wheels or other tools whilst not being so large as to require an excessive cross-travel of the tool carriage when changing from one tool to the other, as described below.

The scope of the present invention is defined in the appended claims, and alternative ways of carrying it into effect will now be particularly described, by way of example only, with reference to the accompanying drawings in which:

Figure 1:
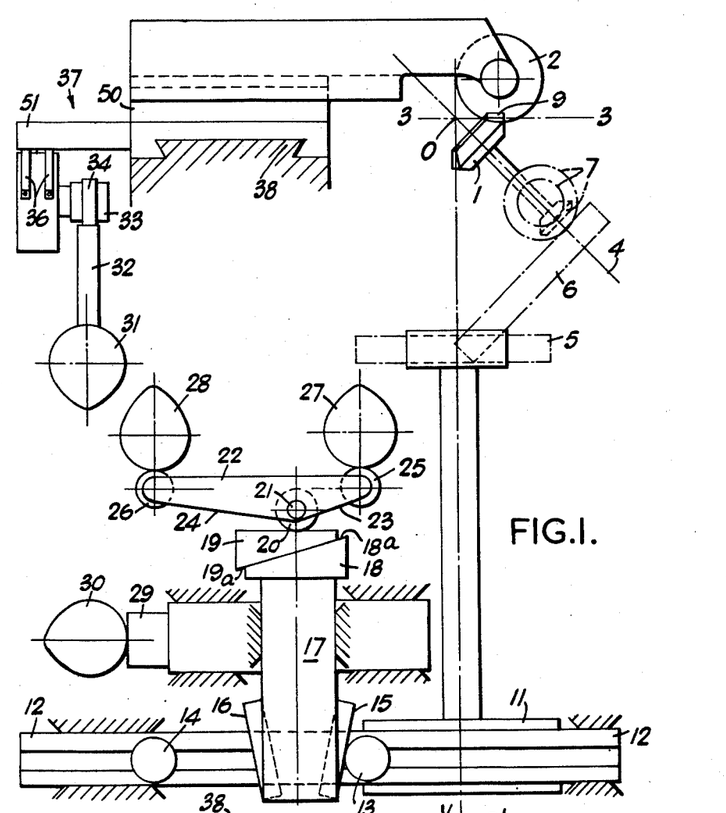
Figure 1 is a schematic layout of the mechanism of the machine, seen in side elevation.
Figure 2:
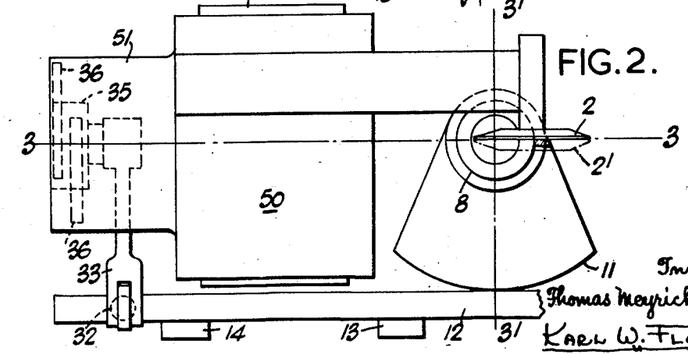
Figure 2 is a plan view of part of the mechanism illustrated in Figure 1.
Figure 3:
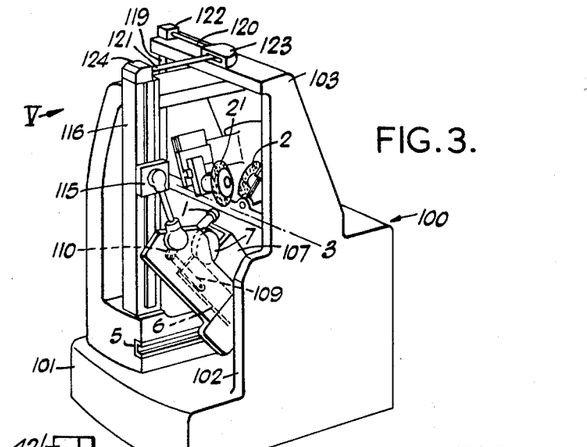
Figure 3 is a perspective view of a complete machine.

In the mechanism illustrated schematically in Figures 1 and 2, the gear blank 1 is rolled past the tool 2 (shown as a grinding wheel) with a motion equivalent to the rolling of a fundamental or generating cone for the tooth profile on a generating plane 3 normal to the plane of the figure. For a so-called "octoid" tooth profile, the generating cone is the pitch cone, and for a true or spherical involute tooth profile it is the base cone. The axis 4 of the gear blank 1 intersects this plane 3 in the cone apex O. The rolling motion is such that the line of contact between the tool 2 and the tooth flank (which represents the generatrix of the profile) when no cut is actually being taken always lies close to (for an octoid profile) or in (for a spherical involute profile) the generating plane 3. In the case of an octoid the generatrix oscillates about a mean position which always lies in the generating plane 3, and the plane of the tool 2 makes an angle with the generating plane equal to the complement of the tooth pressure angle. In the case of a spherical involute profile, the plane of the tool 2 is normal to the generating plane 3.

The motion of the gear blank 1 has two components, viz: the component of rotation about its axis 4, and the component of bodily angular displacement of the cone axis 4 about the vertical OV drawn through the cone apex O. The resultant motion of the blank 1 relative to the tool 2 is derived from the vectorial sum of the rectilinear displacements of two interconnected slides 5, 6 each of which is guided in guideways (to be described later) which are formed on or fixed to a subsidiary frame (also described below). The latter carries the bearings for the work holder and transmission system 7, and moves bodily round the vertical axis OV by virtue of the swinging of the slide 5 as the latter moves without slipping around the periphery of a base drum 8 which is substantially fixed in the machine. This base drum represents the generating plane 3 in the generating roll mechanism, as described in the said prior application.

If the generating plane 3 is a pitch surface of an octoid gear or crown wheel meshing with a blank 1, the ratio of the transmission system 7 will be suitably modified, in conjunction with a slight change of angle of the axis 4 relative to plane 3, from the corresponding values required for a spherical involute tooth profile. The plane of the tool 2 will also be moved away from the normal to the generating plane 3 through an angle equal to the pressure angle of the tooth.

The base drum 8 is mounted for limited rotation about its axis in the machine frame. This displacement is controlled by means of a sector 11 which is geared, or coupled by means of oppositely directed taut bands in known fashion, to a rectilinearly reciprocable base drum actuating slide 12 mounted in fixed guides in the machine frame (not shown). The reciprocation of this slide is in turn controlled by the engagement of one of a pair of follower rollers 13, 14 with the inclined control edge of a respective sine bar 15, 16 mounted on a feed control slide 17 which is reciprocable at right angles to the base drum actuating slide 12. The sine bars 15, 16 are set at relatively small angles to the axis of reciprocation of the feed control slide 17 and may either be permanently fixed or adjustable for angle as preferred. One end of the feed control slide 17 terminates in a taper head 18 set transversely to the slide and having its outer taper edge 18a in contact with a correspondingly tapered edge 19a of a tooth thickness adjusting block 19. This block 19 can be moved in the direction of its length relative to the tapered head 18 on the feed control slide 17 and may be adjustably clamped thereto in any desired position. Since the opposite tapers in effect constitute means for adjusting the length of the slide 17 relative to the remainder of the mechanism, and hence for imparting a fixed increment of rotation of the base drum 8, they are operative to control the tooth thickness of the finished gear.

A roller 20 bears on the opposite edge of the tooth thickness adjusting block 19 and its pivot pin 21 is reciprocable in the same direction as the feed control slide 17 but is not laterally displaceable. The pivot pin 21 also engages a lever 22 having arms 23, 24 of unequal length.

Each arm 23, 24 of the lever 22 terminates in a cam follower formation 25, 26 respectively, which may be constituted by a roller, the formation or roller 25 at the end of shorter arm 23 of the lever bearing against a feed cam 27. The cam follower formation or roller 26 on the end of the longer arm 24 of the lever 22 bears against a tip or root relief cam 28.

The operation of the mechanism so far described is as follows:

Assuming that the tip and root relief cam 28 remains fixed, rotation of the feed cam 27 forces the lever 22 away from the cam shaft, the lever functioning as though it were pivoted about the cam follower roller 26 bearing against the edge of the tip and root relief cam 28. The roller 20 is thereby displaced in the direction towards the feed control slide 17. The latter is, therefore, in turn displaced by the same amount so that the sine bar 15 displaces the base drum actuating slide 12 through a distance related to the distance of travel of the feed control slide 17 by the sine of the angle to which the sine bar 15 is set. The base drum 8 in the generating roll mechanism is thus given a slight angular displacement which is superimposed on the bodily angular or lateral displacement of the gear blank axis 4 through the slide 5. The axis 4 is thus moved to a greater extent, this movement being arranged to feed the tooth flank being generated towards the tool 2.

It will thus be seen that by coupling, through appropriate gearing (not shown in Figure 1), the feed cam 27 to the drive for the generating roll mechanism 7, a predetermined amount of feed can be imparted to the gear blank 1 during its generating roll motion. The feed cam 27 may be arranged to execute continuous rotation during machining of a particular tooth flank, or it may have increments of rotation imparted thereto at one end or both ends of the traverse of the tool along the tooth 9.

In similar manner, it will be understood that the tip and root relief cam 28 will also effect increments of rotation of the base drum 8. This cam, however, is only caused to rotate over a portion of each generating roll of the gear blank 1, and serves to add additional component of feed motion to that provided by the feed cam 27 when either the tip or the root, or both, of the tooth flank is being machined.

When the mechanism is changed over to machine the opposite flank of a tooth 9, both the feed cam 27 and the tip and root relief cam 28 must be re-phased with respect to the work. First, in order to ensure that the feed of the work into the tool commences, on the new flank, at the same point—say, the tip—as it did on the other flank, the feed cam 27 must be allowed to idle for one stroke (either a "roll up" or a "roll back") of the roll mechanism. Secondly, before the tool 2 is fed into the tooth gap at the start of a new flank, the feed cam must have returned to the zero position. Furthermore, the tip and root relief cam 28 must be correctly phased with the roll of the tooth, and must also idle for one stroke. Interlocks must therefore be provided in the cam drives to ensure the satisfaction of these conditions. It should be noted that the second condition set out above for the re-phasing of the feed cam 27 may require that the roll mechanism should execute several idle strokes before the work engages the tool.

It will be further understood that the zero position of the base drum 8 will be determined, for any given sine bar setting at 15 (or 16), by the zero position of the feed control slide 17 when the feed and tip and root relief cams 27, 28 are in their minimum positions. This zero position is determined by the relative positions of the oppositely tapered head 18 and block 19 on the one end of the feed control slide 17, and means is provided for calibrating these components in terms of tooth thickness.

In order to form longitudinally curved teeth, the feed control slide 17 is mounted in guides on a slide 29 which is itself displaceable laterally, in a direction parallel to the base drum actuating slide 12. This lateral travel of the feed control slide 17 can take place without detriment to its normal operation of controlling the tooth feed or tip or root relief feed motions by virtue of the provision of the roller 20 as the slide is displaced laterally. In the arrangement shown in Figure 1, the guides for the feed control slide are formed or carried on a curved tooth slide 29 whose position is controlled by a cam 30. This cam is geared to, or mounted on a common shaft with, a tool displacement cam 31, both cams being operated by, or in predetermined relationship to, the generating roll mechanism in such a way that additional travel is imparted to the base drum actuating slide 12 when the ends of the tooth flank are being machined. A cam follower 32 bears on the cam 31 and is pinned to a crank arm 33 whose other end is keyed on the shaft 34 of a drum 35. This drum is connected by oppositely directed taut flexible bands 36 to a slide assembly 37 on which the tool 2 and its driving mechanism are carried. The slide assembly 37 is traversible along a fixed guideway 38 in a direction at right angles to the line 3' (see Figure 2). This line represents the normal direction of traverse of the tool 2 along the length of the tooth 9.

In the mechanism so far described, the slide 12 has been assumed to be in the position shown in Figure 1 in which the one roller 13 of the pair of rollers 13, 14 is in operative engagement with the corresponding sine bar 15 of the pair of sine bars 15, 16 carried on the feed control slide 17. The feed motion imparted by this arrangement to the work 1 is thus related to a tooth flank on one side only of a tooth 9. When it is desired to machine the opposite flank of a tooth 9, it will be appreciated that the blank 1 must be indexed with respect to the tool 2 through at least a tooth thickness and, since it would normally not be desirable to change the tool for one which moves in the same path but has oppositely directed cutting edge, the indexing motion would normally be about a half tooth pitch to allow the other tooth flank to be engaged by a second tool. This indexing motion is equivalent to an angular displacement of the axis 4 and can be applied through the same mechanism as that already described.

Provision is made in this mechanism for performing the necessary indexing motion by moving the base drum actuating slide 12 through the necessary distance, thus causing disengagement of the roller 13 from its co-operating sine bar 15 on the feed control slide 17 and bringing the second roller 14 into engagement with its corresponding sine bar 16. In this way, it will be understood that an exactly similar feed motion will now be superimposed on the normal generating roll motion through the feed control slide 17 as was the case when the roller 13 was operative, but the zero position of the blank 1 has been altered to present the other flank of a tooth 9 to its tool. The mechanism thus eliminates the necessity of re-setting the blank 1 in its work holder between successive machinings of opposite sides of a tooth 9.

Figure 4:
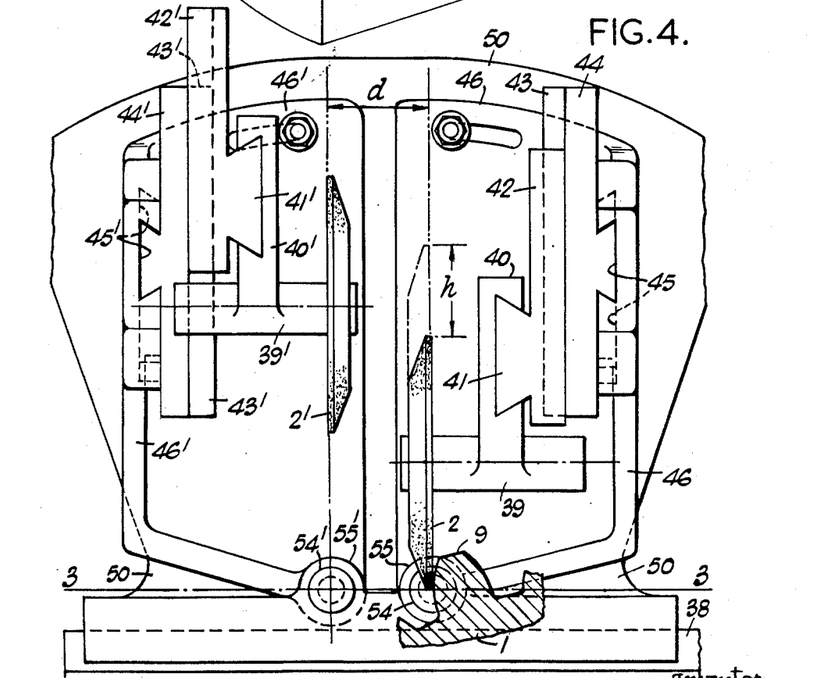
Figure 4 shows a preferred arrangement of tools.
Figure 5:
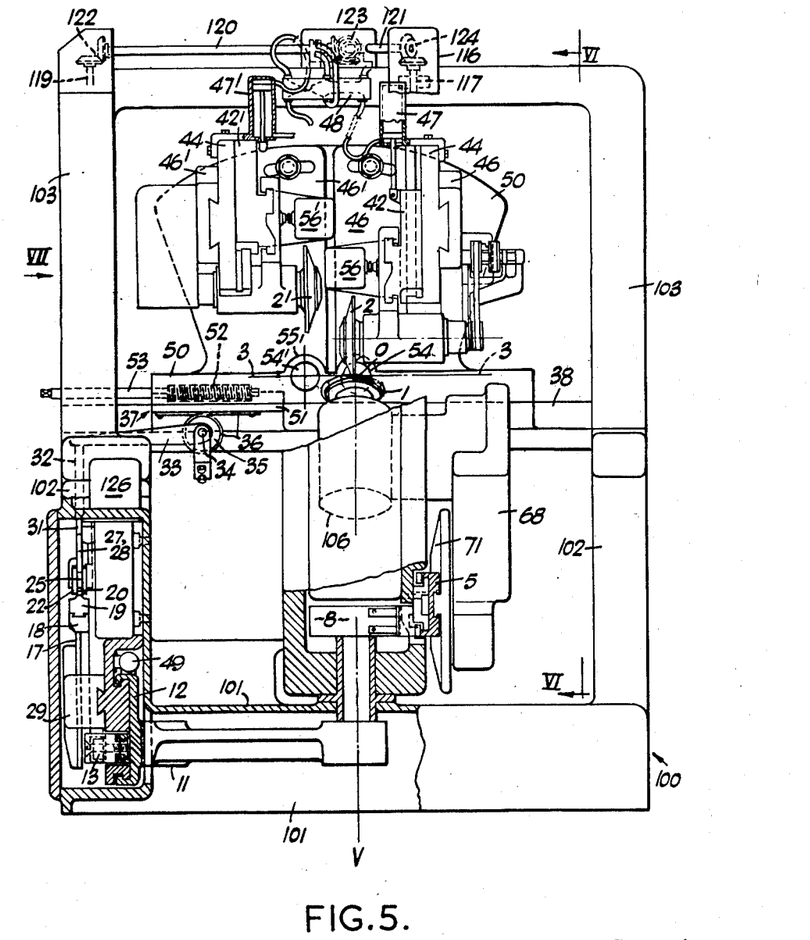
Figure 5 is a part-sectional front elevation of the machine seen in the direction of the arrow V of Figure 3, parts being broken away for clarity of illustration.
Figure 6:
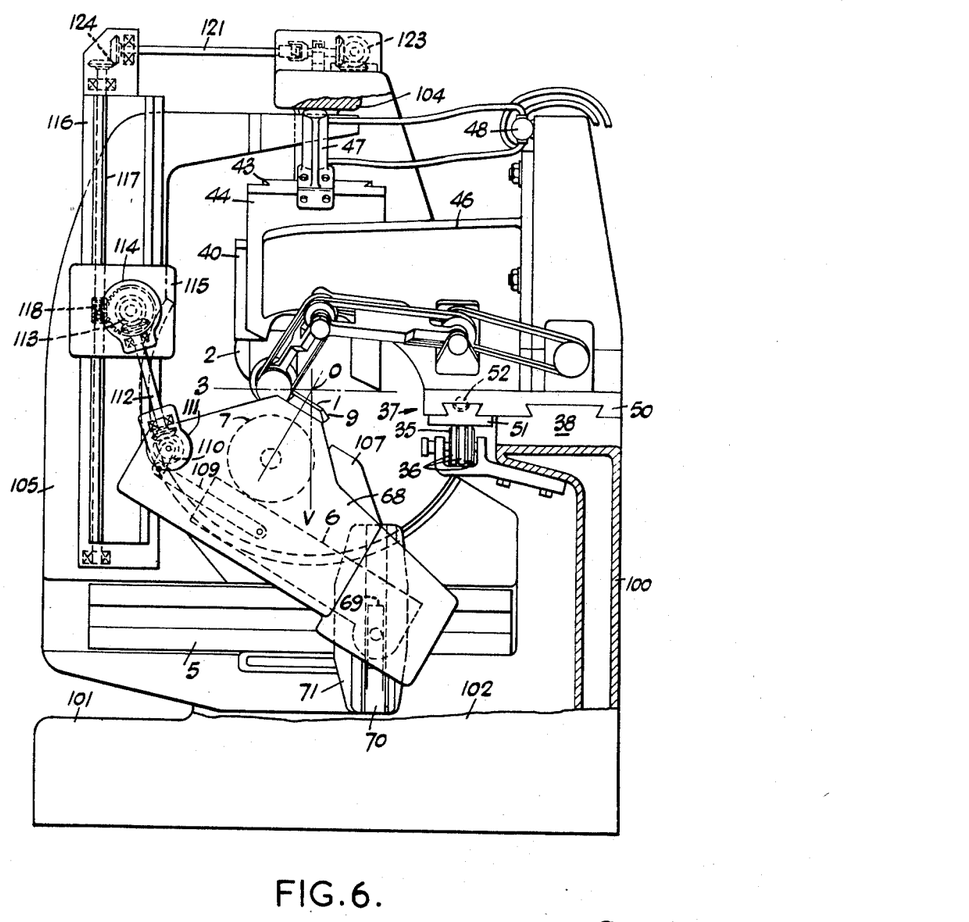
Figure 6 is a section on the line VI—VI of Figure 5.

As indicated above, the machine according to the present invention employs two tools 2, 2' (see Figures 3–7) for machining the opposite flanks of a tooth 9. The tools 2, 2' are alternatively engageable one at a time with the work 1, as will be described below, and each is arranged, when in the operative position (see the tool 2 in Figure 4), to follow the same path of traverse lengthwise of the tooth 9. Since the machine must be capable of machining both spherical involute and octoid tooth profiles, the tools 2, 2' must be able to be set in planes which are normal to the generating plane 3, or at equal and opposite pressure angles to the normal to the generating plane 3. Figures 4 and 5 show the tools 2, 2' in the former position, and Figures 3 and 6-8 show the tools (or their associated structure) in the latter position.

Since the work axis 4 always passes through the cone apex O (except when machining skew gears) the tools 2, 2' must be adjustable for pressure angle about respective axes P, Q (Figure 8) which lie in the generating plane 3, and either of which can be brought into coincidence with the generatrix of the tooth profile when the respective tool 2 or 2' is rendered operative. When changing from one flank of a tooth 9 to the other, the tools 2, 2' are interchanged by displacing the tool assembly as a whole laterally through the distance $d$. The separation $d$ between the axes P, Q is not critical and is determined primarily by convenience of design and accessibility.

For machining skew gears, in which the line of each tooth is tangential to a circle centred on the point O, the operative tool 2 or 2' must be offset through a distance equal to the radius of the said circle. Since both tools will be offset in the same direction, this offsetting can be achieved by a lateral displacement of the entire tool assembly. As described below, with reference to Figures 5 and 7 and Figure 9, this displacement is controlled by a screw 52.

The mechanism for interchanging the tools 2, 2' is preferably ganged to the mechanism for interchanging the rollers 13, 14 when the gear blank 1 is being indexed, as will be described below. The two tools 2, 2' shown in Figures 3-7 are alternatively retractable through an hydraulic servo and interlock mechanism described below. This ensures that only the tool which is appropriate to the tooth flank being machined will be in the operative position at any one time. The tools are carried in bearing housings 39, 39' (see Figure 4) slung from the traverse saddles 40, 40' (see also Figure 8) which are movable in the lengthwise direction of a tooth 9 on horizontal slideways 41, 41' on respective tool retracting slides 42, 42'. Traverse of the tools is effected by respective traverse motors 56, 56' (Figure 5) mounted on the slideways 41, 41' and coupled to the traverse saddles 40, 40' by a crank or similar mechanism. These slides work on guides 43, 43' on dedendum angle setting blocks 44, 44' which can be adjusted in arcuate dovetails 45, 45' each formed on a side wall of a respective pressure angle bracket 46, or 46' and struck about an axis through the work cone apex O.

Figure 7:
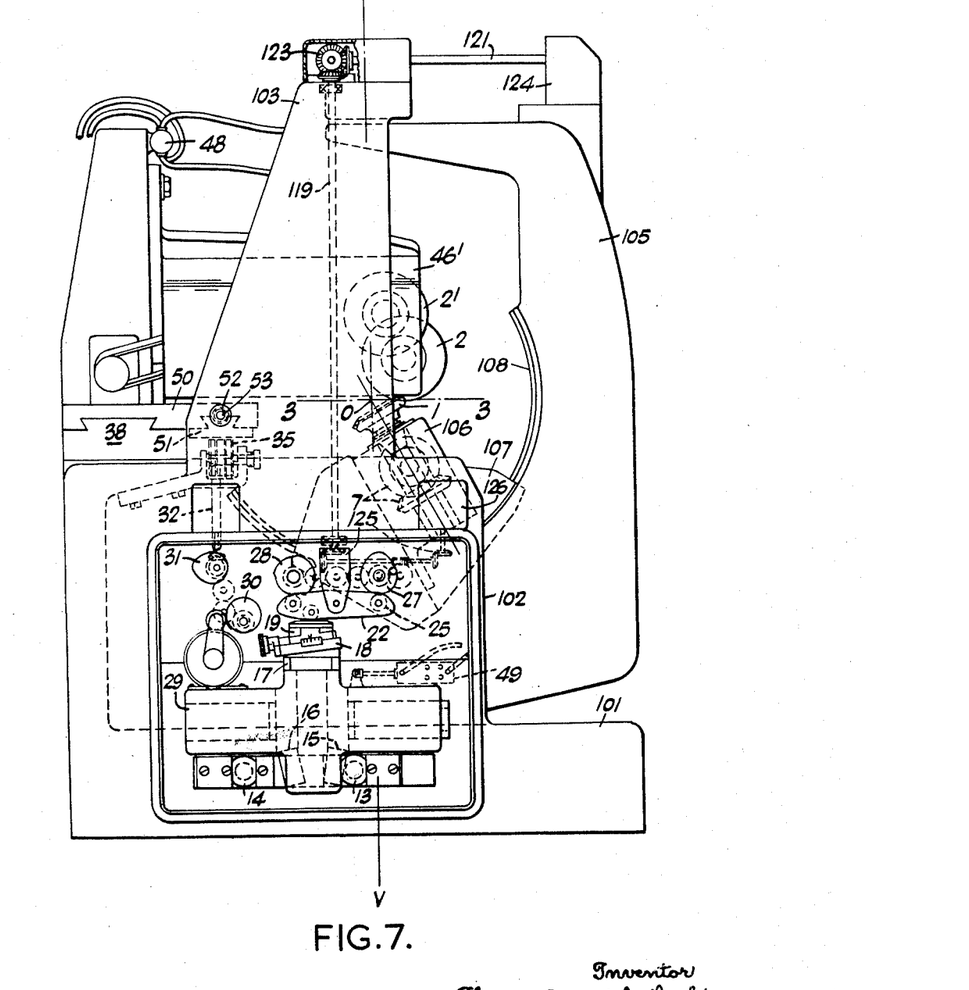
Figure 7 is a view on the arrow VII of Figure 5.

The tool retraction slides 42, 42' are reciprocated in anti-phase by motors 47, 47' energised through a distributor 48 from a double-acting piston and cylinder master unit 49 (Figures 5 and 7). This is controlled by the displacements of the change-over slide 12. As the latter moves to disengage one roller (13) from its associated sine bar (15) and engage the other roller (14) with its sine bar (16), the piston of the master unit 49 makes a stroke and circulates oil through the distributor 48 to the servomotors 47, 47'. These are thus operated to bring the correct tool into register with the work 1.

Figure 8:
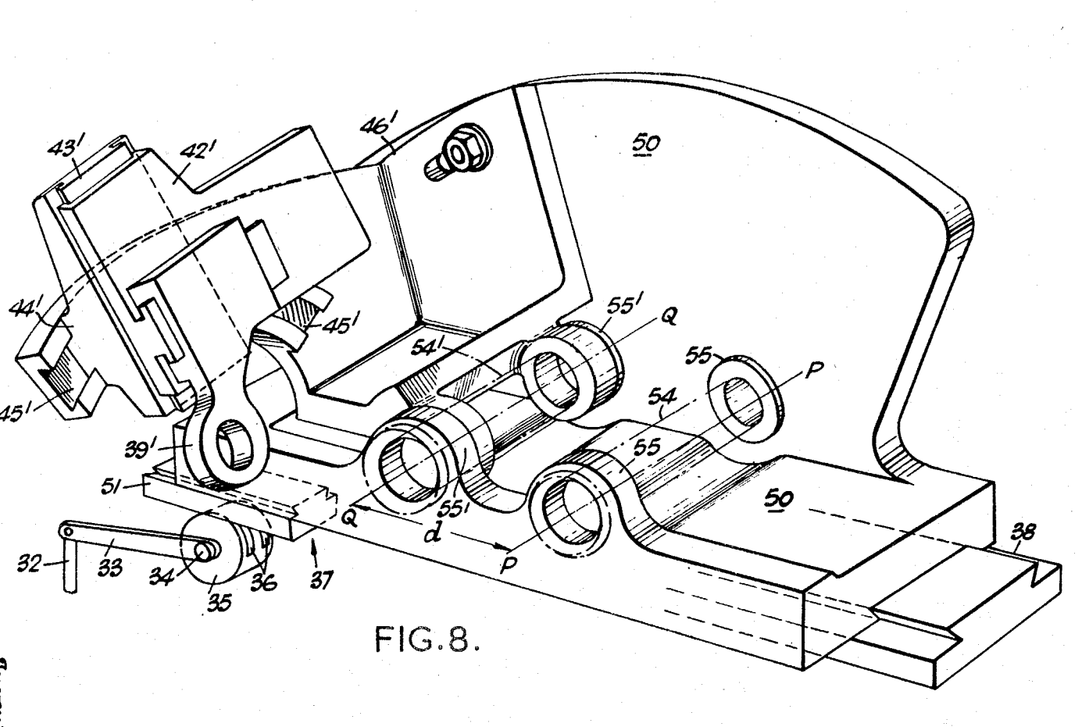
Figure 8 is a front perspective view of the tool carriage of Figures 5–7, both tools and one pressure angle bracket being omitted for clarity.

The pressure angle brackets 46, 46' are mounted on the pivot pins 54, 54' (Figures 4, 5 and 8) for limited adjustment about axes P, Q in the generating plane 3 (Figure 8). The pins 54, 54' are locked in respective pairs of aligned bosses 55, 55' (see in particular Figure 8) on a tool carriage 50 forming one component of the compound slide assembly 37. This carriage extends for substantially the full width of the machine and is positioned by a tool control slide 51 forming the other component of the assembly 37. The taut flexible bands 36 are anchored to the tool control slide 51. The relative positions of the parts 50 and 51 is determined by a screw 52 (Figures 5 and 6) on a shaft 53 which projects outside the frame 100 for attachment of a handwheel or crank. This screw can be used to give lateral off-set of the tools from the cone apex for machining skew gears.

When the tools 2, 2' are to be interchanged for machining the opposite flanks of the teeth 9, traverse of the tool assembly shown in Figures 5-8 can be effected by the tool displacement cam 31 which will then have two control surfaces or "lifts" of different radii, the radii being in suitable proportion and the cam being capable of being indexed in relation to its drive for the purpose of selecting the appropriate "lift." Alternatively, the cam follower 32 may be adjustable for length.

Figure 9:
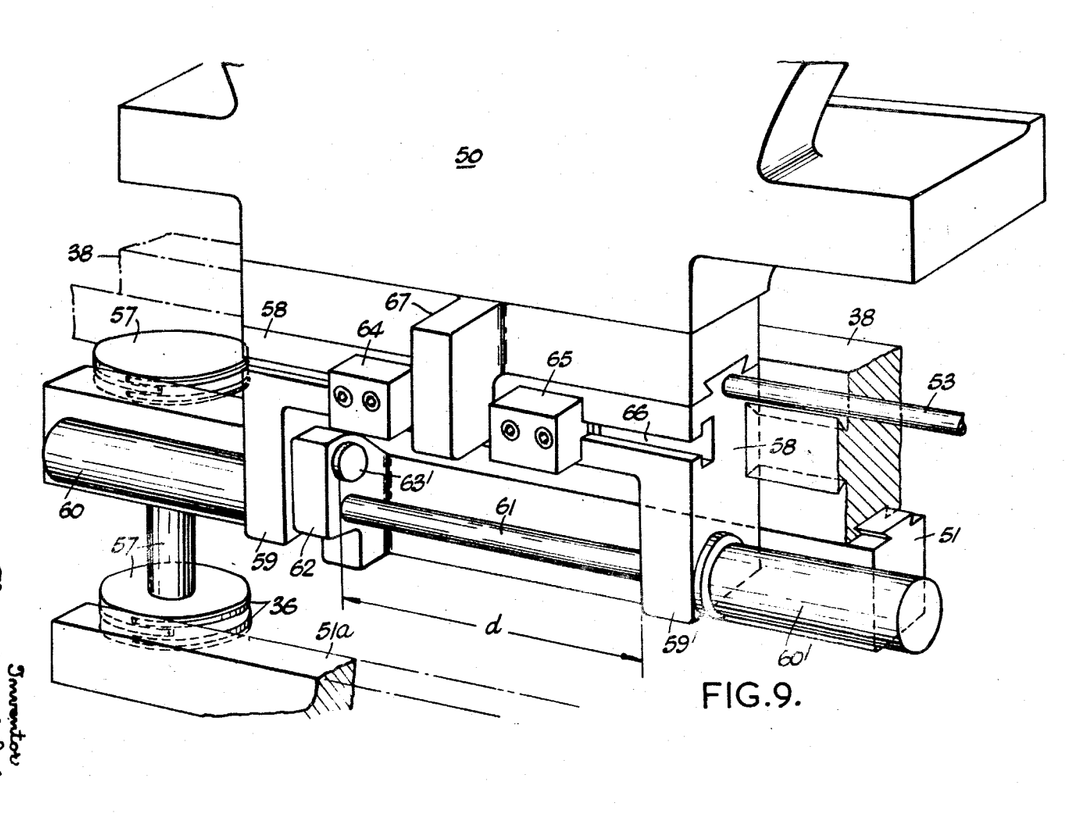
Figure 9 is a rear perspective view of a modified arrangement of tool carriage and associated mechanism.

In Figure 9 which shows a modified arrangement of the tool carriage 50 and the tool control slide 51, the latter is driven indirectly from the tool displacement cam 31 through an intermediate tool slide 51a and the taut band and drum system designated collectively 57. The traverse of the tools through the distance $d$ is effected by relative displacement between the tool carriage 50 and the tool control slide 51. For this purpose, the tool carriage 50 is slidably mounted on a supporting structure comprising a tool selector yoke 58 which is externally slidable on the fixed guideway 38 and has depending arms 59 and 59' at each end thereof. The tool carriage 50 is adjustably locked to the selector yoke supporting structure by means of the threaded shaft 53. The yoke 58 can take up either of two limit positions lengthwise of the tool control slide 51 by means of opposed hydraulic motors having their respective cylinders 60 and 60' bolted to the arms 59, 59' respectively, and a common piston rod 61 anchored, between the arms, in a stop block 62 projecting rearwards from the tool control slide 51. The stop block 62 has on its side faces, accurately adjustable pads, one of which is shown at 63', which are each engageable with the opposed inward face of the corresponding arm 59 or 59' as the case may be. The distance between the disengaged arm and its coacting pad—in the figure, the arm 59' and the pad 63'—is equal to the distance $d$.

When the tools 2, 2' are to be changed, the hydraulic motors 60, 60' are appropriately energised to push the selector yoke 58 from its existing limit position to the other limit position. In the figure, the parts are shown as set for the operation of the tool 2 (Figures 3-7), and if the tool 2' is now to be brought into the operative position, the motors 60, 60' are energised so as to move the selector yoke 58 to the left until the arm 59' engages the pad 63'. In this operation, it will be noted that the tool control slide 51 is not moved.

Offset of the tools 2, 2' is determined by means of a pair of offset stops 64, 65 which are adjustable along a slot 66 in the rear face of the selector yoke 58. Between these stops is located a tongue 67 integral with or secured to the back of the tool carriage 50. When a skew gear is to be machined, the stop 64 or 65 appropriate to the "hand" of the skew gear is moved away from its central position (which is the position when machining a straight radial bevel) through a distance equal to the radius of the circle to which the teeth of the skew gear are tangential. The tool carriage 50 is then traversed by the threaded shaft 53 until the tongue 67 abuts the stop which has been offset.

The machine as shown in Figures 3 and 5-7 consists essentially of a somewhat box-like frame 100 (Figure 3) consisting of a bedplate portion 101 and rigid side frames 102 which support a bridge-like structure 103. An upper bearing 104 (Figure 6) in the cross-limb of the bridge structure 103 and a lower bearing (not illustrated) in the bedplate 101 are co-axially aligned on the vertical axis OV (see also Figure 1) and provide the pivots for a swinging frame 105 on which the work head 106 is adjustably supported on a carriage 107 (Figure 7) which runs on arcuate guideways 108 struck about the apex O.

The rectilinear slide 6 reciprocates in a housing 68 (Figures 5-7) which is rigidly attached to the carriage 107, and at its lower end pivotally engages a slipper 69 (Figure 6) which can slide in a vertical slot 70 in a block 71. This block is itself adjustably located along the length of the slide 5 so as to take up the correct position for any particular work-piece 1. The direction of reciprocation of the slide 6 is always at right angles to the direction of the work axis 4, and lies in a vertical plane.

The swinging frame 105 is oscillated about the axis OV by the generating roll mechanism to impart to the work 1 the component of its motion about the axis OV. This is effected by applying a drive to the slide 6 which in turn imparts a reciprocatory motion to the slide 5.

As the slide 5 reciprocates it moves around the base drum 8, as already described, in a horizontal plane to effect swinging of the frame 105 about the axis OV. The slide 6 is coupled by a link 109 (Figure 6) to a crank 110 which is rotatable through bevel gearing (not shown) mounted in a casing 111 and driven by a short swinging layshaft 112. This layshaft is in turn driven by a bevel gearing 113 enclosed in a housing 114 which is mounted on a pick-off saddle 115 slidable on a vertical guideway 116, formed or secured on one side of the swinging frame 105. Within the guideway 116 is located a vertical shaft 117 having a straight keyway or splines and mounted in bearings at each end of the guideway. A worm 118 is keyed or splined on this shaft 117 and is captive in the saddle 115 to provide a continuous drive to the gearing 113 for the layshaft 112. The shaft 117 is driven through a succession of shafts 119, 120 and 121 coupled by bevel gearings indicated at 122, 123 and 124. The shaft 121 is driven through gearing 125 from the electric motor 126 which also serves to drive the feed and tip relief cams 27 and 28.

The oscillatory motion of the frame 105 about the axis OV is thus positively related to the feed action and the tip relief motion imparted thereto through rotation of the base drum 8, as previously described. The gearing 123 is arranged to maintain constant angular velocity of the shaft 117 during the swinging of the frame 105.

What I claim is:

1. In a bevel gear generating machine, a frame, a work holder for supporting a work piece and mounted in the frame for angular displacement about an axis normal to the generating plane and containing the cone apex of the work, a work spindle rotatably supported in the work holder with its axis passing through the cone apex, a tool carriage located in the frame, a pair of tools mounted on the carriage for alternative engagement with the work along a generatrix of the tooth profile in the generating plane, a tool supporting structure for each tool pivotally adjustable on the tool carriage about a respective axis lying in the generating plane and parallel to the generatrix of the tooth flank profile, means for displacing the tool carriage in a direction perpendicular to the said generatrix and parallel to the generating plane, through a distance at least equal to the spacing between the said pivotal axes so as to bring either axis into register with the tooth flank profile generatrix, means for advancing into an operative position the tool associated with the pivotal axis so brought into register for the time being and for retracting the other tool to an inoperative position, and means for producing a generating roll displacement of the work relative to the operative tool.

2. In a bevel gear generating machine, a frame, a work holder for supporting a work piece and mounted in the frame for angular displacement about an axis normal for the generating plane and containing the cone apex of the work, a work spindle rotatably supported in the work holder with its axis passing through the cone apex, a tool carriage located in the frame, a pair of tools mounted on the carriage for alternative engagement with the work along a generatrix of the tooth profile in the generating plane, a pair of tool supporting brackets each mounted on the tool carriage by a respective pivot pin, the said pivot pins having their axes parallel to the said tooth profile generatrix and being spaced apart in the generating plane by a distance sufficient to allow adequate working clearance between the tools and their associated structures when the tools are set normal to the generating plane, means for clamping the said brackets to the tool carriage in any position of angular adjustment about their respective pivot pins to permit both tools to be set simultaneously to the same pressure angle with respect to the work, means for displacing the tool carriage in a direction perpendicular to the said generatrix and parallel to the generating plane through a distance at least equal to the spacing between the said pivotal axes so as to bring either axis into register with the tooth flank profile generatrix, means for advancing into an operative position the tool associated with the pivotal axis so brought into register for the time being and for retracting the other tool to an inoperative position, and means for producing a generating roll displacement of the work relative to the operative tool.

3. A bevel gear generating machine as claimed in claim 2 comprising a slide bed extending parallel to the direction of displacement of the tool carriage, means for mounting the tool carriage on the slide bed, interengageable stop members located one on the tool carriage and another on a relatively fixed part of the machine so as to define the limit positions of displacement of the tool carriage which are spaced apart by the distance between the said pivot pins, and means for clamping the tool carriage in either limit position of displacement as defined by interengagement of a pair of stop members.

4. A bevel gear generating machine comprising a frame, a work holder for supporting a work piece, a pair of alternatively operative tools, a generating roll mechanism for producing a relative generating roll motion between the work and a selected operative tool, a tool carriage having mounted thereon a pair of pressure angle adjusting brackets, one for supporting each tool, said bracket being pivotally adjustable about spaced parallel axes lying in the generating plane and parallel to the generatrix of the tooth flank to be machined, and means for displacing the tool carriage relative to the work through a distance equal to the spacing between the said axes so as to bring either axis into coincidence with the said generatrix in dependence on whichever tool is selected to operate on the work.

5. A bevel gear generating machine comprising a frame, a work holder for supporting a work piece, a pair of alternatively operative tools, a generating roll mechanism for producing a relative generating roll motion between the work and a selected operative tool, a tool carriage having mounted thereon a pair of pressure angle adjusting brackets, one for supporting each tool, said brackets being pivotally adjustable about spaced parallel axes lying in the generating plane and parallel to the generatrix of the tooth flank to be machined, a slide bed fixed in the frame and extending parallel to the generating plane and perpendicular to the said generatrix, a tool carriage support slidably mounted on the said slide bed, interengageable stop members one on the said support and another on a relatively fixed component of the machine, said stop members serving to define two limit positions of relative displacement between the support and said component which are separated by the spacing between the pivotal axes of the pressure angle adjusting brackets, and means for clamping the appropriate pair of stop members in mutual engagement in dependence on whichever tool is selected to operate on the work.

6. A bevel gear generating machine comprising a frame, a work holder for supporting a work piece, a pair of alternatively operated tools, a generating roll mechanism for producing a relative generating roll motion between the work and a selected operative tool, a tool carriage having mounted thereon a pair of pressure angle adjusting brackets, one for supporting each tool, said brackets being pivotally adjustable about spaced parallel axes lying in the generating plane and parallel to the generatrix of the tooth flank to be machined, a slide bed fixed in the frame and extending parallel to the generating plane and perpendicular to the said generatrix, a tool carriage support slidably mounted on the said slide bed, a tool control slide also mounted on the slide bed adjacent the tool carriage support for limited displacement in a direction parallel to that of the tool carriage, interengageable stop members one on the said support and another on the tool control slide, said stop members serving to define two limit positions of relative displacement between the support and the tool control slide which are separated by the spacing between the pivotal axes of the pressure angle adjusting brackets, and means for clamping the appropriate pair of stop members in mutual engagement in dependence on whichever tool is selected to operate on the work.

7. A bevel gear generating machine as claimed in claim 6, wherein the tool control slide is coupled to mechanism, geared to the generating roll mechanism, for imparting small displacements thereto during traverse of the operative tool lengthwise of the tooth flank when machining a curved flank.

8. A bevel gear generating machine comprising a frame, a work holder for supporting a work piece, a pair of alternatively operative tools, a generating roll mechanism for producing relative generating roll motion between the work and a selected operative tool, a slide bed fixed in the frame and extending parallel to the generating plane and perpendicular to the generatrix of a tooth flank to be machined, a tool carriage support slidably mounted on the said bed, a tool carriage located on the support for slidable adjustment relative thereto in a direction parallel to the slide bed, a pair of pressure angle adjusting brackets, one for each tool, said brackets being pivotally adjustable on the tool carriage about respective axes lying in the generating plane and parallel to the generatrix of the tooth flank to be machined, means for locking the carriage to the support in a selected position corresponding to any desired amount of lateral offset of the tools from the line of the generatrix of a straight radial tooth flank profile when a skew gear is to be machined, and means for positively locating the tool carriage support lengthwise of the slide bed in either of two limit positions in which the pivotal axis of the pressure angle adjusting bracket carrying the operative tool is located in alignment with the generatrix of the tooth flank profile to be machined.

References Cited in the file of this patent
UNITED STATES PATENTS

| | | |
|---|---|---|
| 1,135,780 | Drummond et al. | Apr. 13, 1915 |
| 1,659,224 | Teller | Feb. 14, 1928 |
| 2,207,018 | Linse et al. | July 9, 1940 |
| 2,221,827 | Wildhaber | Nov. 19, 1940 |
| 2,319,117 | Drummond | May 11, 1943 |
| 2,401,810 | Aeppli | June 11, 1946 |
| 2,404,573 | Graf | July 23, 1946 |
| 2,442,734 | Suire | June 1, 1948 |
| 2,567,460 | Aeppli | Sept. 11, 1951 |

FOREIGN PATENTS

| | | |
|---|---|---|
| 183,010 | Switzerland | Mar. 15, 1936 |